US012112629B2

(12) United States Patent
Johnson et al.

(10) Patent No.: US 12,112,629 B2
(45) Date of Patent: Oct. 8, 2024

(54) PARKING STRUCTURE VEHICLE LOCATION SERVICE

(71) Applicants: DENSO International America, Inc., Southfield, MI (US); DENSO CORPORATION, Kariya (JP)

(72) Inventors: Matthew Johnson, Oak Park, MI (US); Martin Nespolo, Grosse Pointe Woods, MI (US); Thomas Krzyzak, Livonia, MI (US); Sibu Varughese, Shelby Township, MI (US); Ginelle Margaret Reed, Novi, MI (US); Wilson Yim, Ann Arbor, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 80 days.

(21) Appl. No.: 17/991,510

(22) Filed: Nov. 21, 2022

(65) Prior Publication Data

US 2024/0169838 A1    May 23, 2024

(51) Int. Cl.
  *G08G 1/127*  (2006.01)
  *H04W 4/029*  (2018.01)
  *G06Q 30/0645*  (2023.01)

(52) U.S. Cl.
  CPC .......... *G08G 1/127* (2013.01); *H04W 4/029* (2018.02); *G06Q 30/0645* (2013.01)

(58) Field of Classification Search
  CPC .............................. G08G 1/123; G08G 1/127
  See application file for complete search history.

(56) References Cited

U.S. PATENT DOCUMENTS

| 8,299,894 | B1 | 10/2012 | Semeniuk | |
| 9,812,015 | B1* | 11/2017 | Cox | G08G 1/147 |
| 2009/0189779 | A1* | 7/2009 | Gao | G08C 17/00 |
| | | | | 340/901 |
| 2018/0165967 | A1* | 6/2018 | Lee | G07C 5/00 |
| 2022/0198929 | A1* | 6/2022 | Dudar | G08G 1/056 |

FOREIGN PATENT DOCUMENTS

| CN | 104627021 B | 8/2016 |
| GB | 2596113 A | 12/2021 |
| JP | 2017141561 A | 8/2017 |

* cited by examiner

*Primary Examiner* — Benyam Haile
(74) *Attorney, Agent, or Firm* — Harness, Dickey & Pierce, P.L.C.

(57) ABSTRACT

A location system of a shared vehicle includes: a location module configured to, when a signal strength of a global position system (GPS) module is less than a predetermined signal strength, determine a present location of the shared vehicle within a parking structure based on measurements from one or more sensors of the shared vehicle; a floor module configured to, when the signal strength of the GPS module is less than the predetermined signal strength, determine a present floor of the parking structure on which the shared vehicle is located; and a wireless transceiver module configured to, when the shared vehicle is off and parked within the parking structure, transmit the present location and the present floor to a rental server that is remote from the shared vehicle.

20 Claims, 6 Drawing Sheets

PARKING STRUCTURE VEHICLE LOCATION SERVICE

FIELD

The present disclosure relates to shared vehicles and more particularly to systems and methods for tracking location of vehicles within parking structures where signal strength of global positioning systems are low.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles are used to transport people and goods from place to place. Various different types of vehicles are available, such as trucks, multiple different types of utility vehicles, sedans, coupes, convertibles, etc.

Some vehicles may be owned and used by only one or more people. Other vehicles may be used for carsharing (also referred to as ridesharing). Multiple different types of carsharing are available, such as vehicle rentals, ride hailing, peer to peer car rental, commercial truck rentals, etc. In ride hailing, a driver of a vehicle verifies a rider's identity by asking the rider for his or her name and matching the given name to a name on a ride reservation. For other forms of carsharing, however, a driver or owner of the vehicle may not be present to verify identity.

SUMMARY

In a feature, a location system of a shared vehicle includes: a location module configured to, when a signal strength of a global position system (GPS) module is less than a predetermined signal strength, determine a present location of the shared vehicle within a parking structure based on measurements from one or more sensors of the shared vehicle; a floor module configured to, when the signal strength of the GPS module is less than the predetermined signal strength, determine a present floor of the parking structure on which the shared vehicle is located; and a wireless transceiver module configured to, when the shared vehicle is off and parked within the parking structure, transmit the present location and the present floor to a rental server that is remote from the shared vehicle.

In further features, the location module is configured to determine the present location of the shared vehicle based on a speed of the shared vehicle and a steering wheel angle of the shared vehicle.

In further features, the floor module is configured to selectively one of increment and decrement the present floor based on one of a longitudinal tilt and a longitudinal acceleration of the shared vehicle.

In further features, the floor module is configured to selectively one of increment and decrement the present floor when the one of the longitudinal tilt and the longitudinal acceleration is greater than one of a predetermined tilt and a predetermined acceleration continuously for a predetermined period.

In further features, the floor module is configured to increment the present floor when the one of the longitudinal tilt and the longitudinal acceleration in a rearward direction of the shared vehicle is greater than the one of the predetermined tilt and the predetermined acceleration continuously for the predetermined period.

In further features, the floor module is configured to decrement the present floor when the one of the longitudinal tilt and the longitudinal acceleration in a forward direction of the shared vehicle is greater than the one of the predetermined tilt and the predetermined acceleration continuously for the predetermined period.

In further features, a parking structure module is configured to indicate whether the shared vehicle is within a parking structure based on a second present location of the shared vehicle determined by the GPS module of the shared vehicle, where the floor module and the location module are configured to determine the present floor and the present location, respectively, in response to an indication from the parking structure module that the shared vehicle is within a parking structure.

In further features, the parking structure module is configured to indicate that the shared vehicle is within a parking structure when the second present location is within boundaries of a parking structure stored in a parking structure database.

In further features, the parking structure module is configured to indicate that the shared vehicle is not within a parking structure when the second present location is not within boundaries of any parking structure stored in a parking structure database.

In further features, a parking structure module is configured to indicate whether the shared vehicle is within a parking structure based on an ambient light intensity and the signal strength of the GPS module, where the floor module and the location module are configured to determine the present floor and the present location, respectively, in response to an indication from the parking structure module that the shared vehicle is within a parking structure.

In further features, the parking structure module is configured to indicate that the shared vehicle is within a parking structure when the signal strength is less than the predetermined signal strength and the ambient light intensity is less than a predetermined intensity.

In further features, the parking structure module is configured to indicate that the shared vehicle is within not a parking structure when at least one of (a) the signal strength is not less than the predetermined signal strength and (b) the ambient light intensity is not less than a predetermined intensity.

In further features, the wireless transceiver module includes a cellular transceiver module configured to transmit the present location and the present floor to the rental server via a cellular network.

In further features, a computing device of a renter of the shared vehicle is included, where the rental server is configured to selectively transmit the present location and the present floor of the shared vehicle to the computing device of the renter.

In further features: the wireless transceiver module is configured to transmit the present location and the present floor to a computing device of a renter of the shared vehicle; the location system further includes the computing device; and the computing device is separate from the shared vehicle and is configured to transmit the present location and the present floor received from the wireless transceiver module of the shared vehicle to the rental server via a cellular network.

In further features: a second computing device of a second renter of the shared vehicle is included, where the rental server is configured to selectively transmit the present location and the present floor of the shared vehicle to the second computing device of the second renter.

In further features, the second computing device is configured to display, on a display, an indicator of boundaries of the parking structure and the present location and floor of the shared vehicle within the parking structure.

In a feature, a method for a shared vehicle includes: when a signal strength of a global position system (GPS) module is less than a predetermined signal strength, determining a present location of the shared vehicle within a parking structure based on measurements from one or more sensors of the shared vehicle; when the signal strength of the GPS module is less than the predetermined signal strength, determining a present floor of the parking structure on which the shared vehicle is located; and when the shared vehicle is off and parked within the parking structure, wirelessly transmitting the present location and the present floor to a rental server that is remote from the shared vehicle.

In further features, determining the present location of the shared vehicle includes determining the present location of the shared vehicle based on a speed of the shared vehicle and a steering wheel angle of the shared vehicle.

In further features, determining the present floor of the parking structure includes selectively one of incrementing and decrementing the present floor based on one of a longitudinal tilt and a longitudinal acceleration of the shared vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A shared vehicle can track its location, such as using a global positioning system (GPS) of the shared vehicle. When a shared vehicle is parked at the end of a period of use by a renter, the location of the shared vehicle may be transmitted to a rental server that manages rentals of the shared vehicle. The location of the shared vehicle may be transmitted by the rental server to a next renter of the shared vehicle in an attempt to make it easy for the next renter to locate and use the shared vehicle.

Signal strength of the GPS system, however, may be decreased or zero in some locations, such as in some parking garages. As such, a more precise location of the vehicle (than just in the parking structure) may not be available to a next renter of the shared vehicle. This may make locating and using the shared vehicle more time consuming and difficult for the next renter.

The present application involves tracking the location of the shared vehicle while the vehicle is in a parking structure while the GPS system has a signal strength of less than a predetermined value using sensors of the shared vehicle. For example, location of the vehicle on a floor of a parking structure can be measured using a vehicle speed or a wheel speed and a steering wheel angle. For example, mathematically integrating a vehicle speed (e.g., in kilometers per hour) yields a distance (e.g., in kilometers) which can be performed to determine a distance traveled. The steering wheel angle can be used to determine turning or a direction of movement of the vehicle. Rearward or forward tilting of the vehicle for at least a predetermined period can be used to identify that the shared vehicle has changed floors of the parking structure.

Once the shared vehicle is parked at the end of a period of use, the vehicle or a rental device of a renter can be used to transmit the location where the shared vehicle is parked to the rental server. This location will help the next renter locate the shared vehicle within the parking structure and begin using the shared vehicle.

Figure 1:
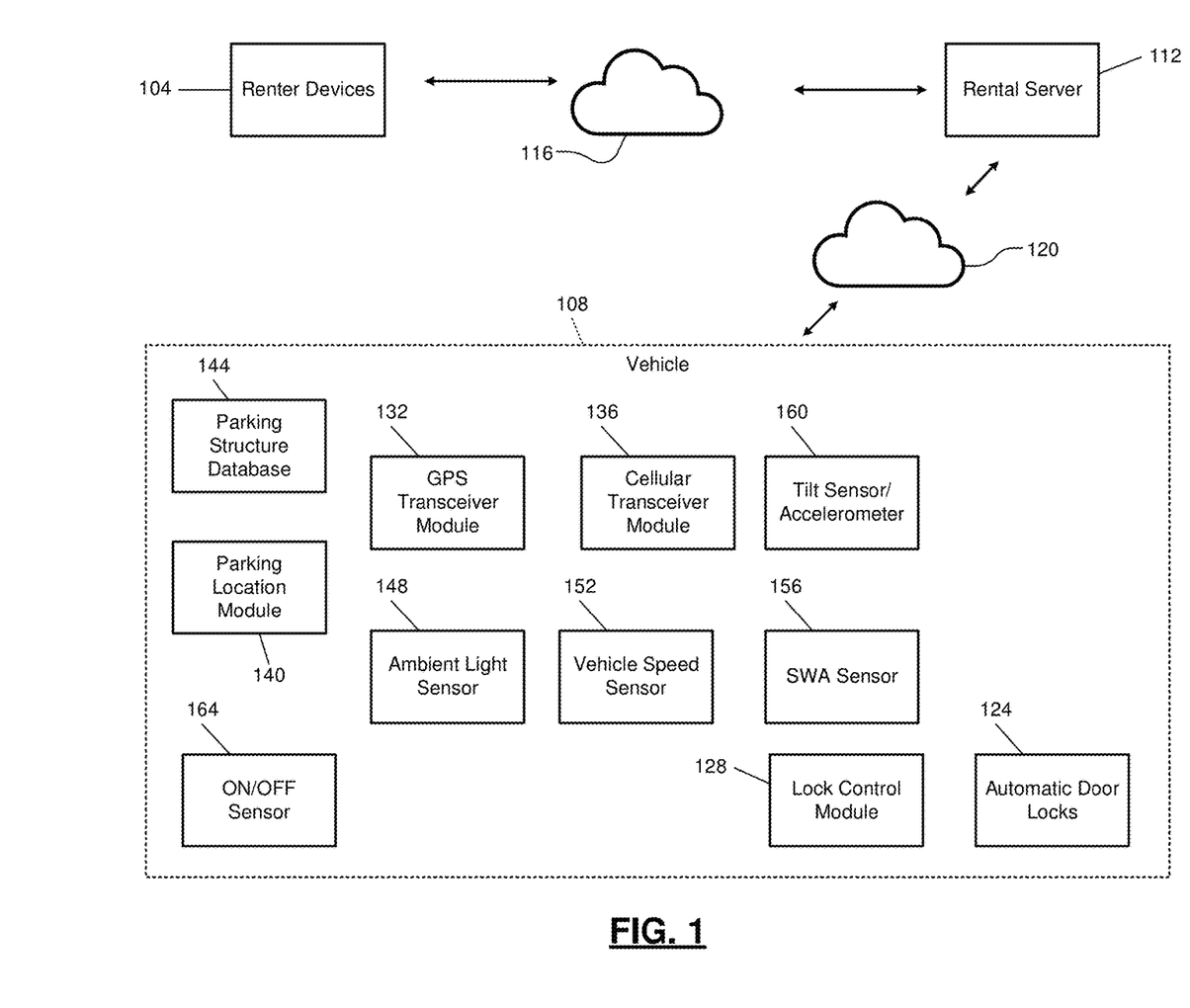
FIG. 1 is a functional block diagram of an example implementation of a vehicle rental system.

FIG. 1 includes a functional block diagram of an example implementation of a vehicle rental system. Vehicle renters can rent vehicles, such as vehicle 108, via renter computing devices 104. Examples of renter computing devices include cellular (smart) phones, tablet devices, laptop computers, and other types of computing devices.

One or more rental servers, such as rental server 112, manage vehicles that are available for rental, dates and times when the vehicles are available for rental (periods of use), etc. The rental devices 104 communicate with the rental server(s) via a network 116, such as the Internet, to rent vehicles, such as the vehicle 108.

Via a renter device, a renter of a vehicle may reserve the vehicle 108 for rental for a rental period with the rental server 112. The rental period is a period of time and may span multiple dates. The renter or an owner or manager of the vehicle may specify where pickup of the vehicle 108 is to occur by the renter. The rental server 112 may manage payment for the rental by the renter, payment for the rental to an owner or manager of a vehicle rented, and one or more other aspects of the rental.

One or more keys and/or key fobs for starting and using a rented vehicle could be left within a rental vehicle (e.g., within a glove box or console) with one or more doors of the vehicle unlocked for a renter. The rental vehicles communicate with the rental server 112 via a network 120, such as the Internet. While the example of the vehicle 108 will be described, each rental vehicle may function similarly and include the same components.

The vehicle 108 includes automatic door locks 124 that actuate and lock and unlock exterior doors, respectively, to a passenger cabin of the vehicle 108. A lock control module 128 may actuate the automatic door locks 124 and lock or unlock one or more of the doors in response to user input to one or more unlock/lock switches or buttons within the passenger cabin. The lock control module 128 may actuate the automatic door locks 124 and lock or unlock one or more of the doors in response to user input to one or more unlock/lock switches or buttons located on an exterior of the vehicle, such as when a key fob is within a predetermined distance of the exterior of the vehicle. The lock control module 128 may actuate the automatic door locks 124 and lock or unlock one or more of the doors in response to user input to one or more unlock/lock switches or buttons located on an exterior of the vehicle, such as when a key fob is within a predetermined distance of the exterior of the vehicle. The lock control module 128 may actuate the automatic door locks 124 and lock or unlock one or more of the doors in response to user input to the key fob. The lock control module 128 may actuate the automatic door locks 124 when one or more other conditions occur. In various implementations, manual door locks may also be manually actuated by users to lock and unlock doors, respectively. In various implementations, a rental device of a user associated with a rental of the vehicle 108 may be used as a key fob, and the lock control module 128 may actuate the automatic door locks 124 and unlock one or more of the doors in response to user input to the rental device or the rental device coming within the predetermined distance of the exterior of the vehicle.

The vehicle 108 includes a global positioning system (GPS) transceiver module 132 configured to determine a present location (e.g., longitudinal position, latitudinal position, and height above ground) based on satellite signals, such as using triangulation. The GPS transceiver module 132 also determines a signal strength of the signals received, such as a relative signal strength indicator (RSSI), or another suitable indicator of signal strength.

The vehicle 108 also includes one or more wireless transceiver modules, such as a cellular transceiver module 136. The cellular transceiver module 136 communicates with various remote devices via a cellular network. The vehicle 108 may also include a wireless transceiver module that communicates using one or more other protocols, such as a WiFi (IEEE 802.11) communication protocol and/or a Bluetooth (IEEE 802.15) communication protocol. The vehicle 108 may communicate with the network 120 via one or more of the wireless transceiver modules.

The GPS transceiver module 132 can determine the present location of the vehicle 108 in parking structures. In some parking structures, however, the signal strength may be less than a predetermined value, and the GPS transceiver module 132 may not be able to track the present location of the vehicle 108.

A parking location module 140 determines the present location of the vehicle 108 when the signal strength is less than the predetermined value within a parking structure based on measurements from sensors of the vehicle 108. The parking location module 140 may determine when the vehicle 108 is in a parking structure when the present location of the vehicle 108 determined by the GPS transceiver module 132 is within the boundaries of a parking structure stored in a parking structure database 144. The parking structure database 144 may include coordinates (e.g., longitudinal and latitudinal) defining boundaries of known parking structures. An intensity of ambient light within parking structures may be lower than outside of parking structures during daytime hours. In various implementations, the parking location module 140 may additionally require that an ambient light intensity measured by an ambient light sensor 148 of the vehicle be less than a predetermined intensity when the present time is within daylight hours to determine that the vehicle 108 is within a parking structure.

Examples of measurements of sensors that the parking location module 140 may use to determine the present location of the vehicle 108 within the parking structure include a vehicle speed measured by a vehicle speed sensor 152, a steering wheel angle (SWA) measured by a steering wheel angle 156, and a tilt or acceleration (forward/rearward) of the vehicle 108 measured by a tilt sensor or accelerometer 160. In various implementations, one or more wheel speeds (e.g., an average) may be used in place of the vehicle speed or used to determine the vehicle speed. The parking location module 140 may determine a distance and a direction moved by the vehicle 108 by determining a mathematical integral of the vehicle speed (providing a distance) and the SWA. The parking location module 140 may track the distance and direction moved over time to determine a path followed by the vehicle 108. An example path through a parking structure is illustrated in FIG. 4.

When the rearward tilt/acceleration (front of the vehicle is vertically above the rear of the vehicle) measured is greater than a predetermined tilt or acceleration for at least a predetermined floor period that is greater than zero, the parking location module 140 determines that the vehicle 108 went up 1 floor within the parking structure. When the forward tilt/acceleration (front of the vehicle is vertically below the rear of the vehicle) measured is greater than the predetermined tilt or acceleration for at least the predetermined floor period, the parking location module 140 determines that the vehicle 108 went down 1 floor within the parking structure. The parking location module 140 tracks the present floor of the vehicle 108, such as relative to ground level where the vehicle 108 entered the parking structure. Requiring that the tilt or acceleration be greater than the predetermined tilt or acceleration allows the parking location module 140 to distinguish floor changes from, for example, traversals of speed bumps by the vehicle 108. The tilt or acceleration may be greater than the predetermined tilt or acceleration when the vehicle 108 traverses a speed bump, but will be for less than the predetermined floor period.

Figure 4:
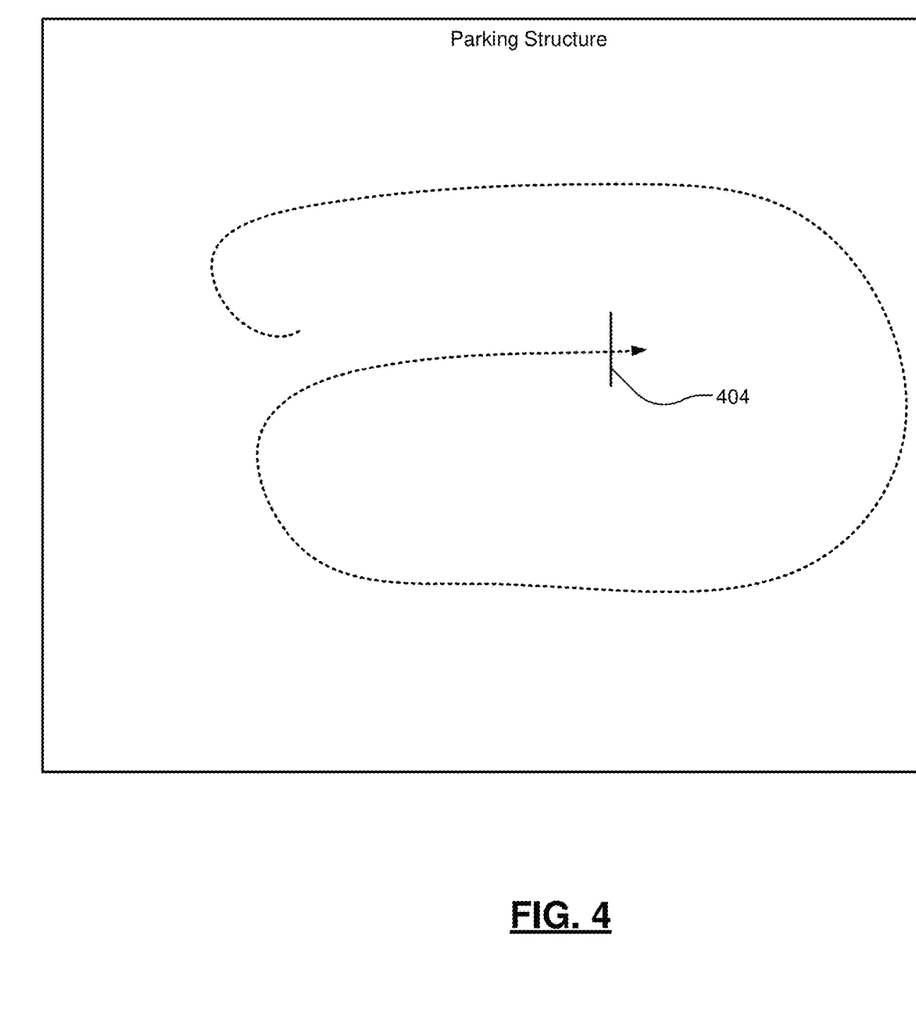
FIG. 4 includes an example path through a parking structure.
Figure 5:
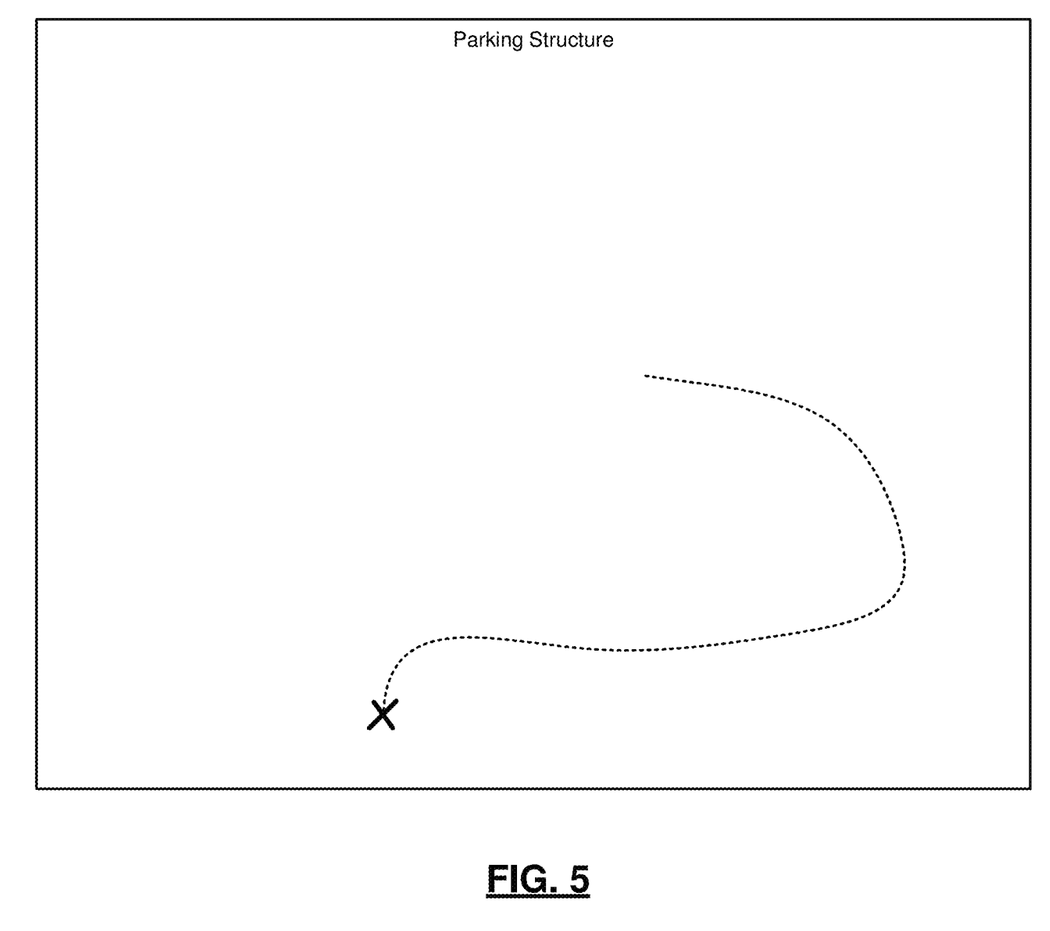
FIG. 5 also includes an example path followed by the vehicle in a parking structure before parking.

Each dot in FIG. 4 includes an example location of the vehicle 108 on a floor of a parking structure determined based on the vehicle speed and the SWA. The parking location module 140 may determine the location, for example, using one or more lookup tables and/or equations that relate vehicle speeds and SWAs to locations. Line 404 illustrates an example location where the parking location module 140 determines that the vehicle 108 has went up one floor. FIG. 5 also includes an example path followed by the vehicle 108 before parking. The X in FIG. 5 is illustrative of an example location of the vehicle 108 where the vehicle 108 was parked and a rental period of the vehicle 108 ended. The location and floor number of the vehicle 108 when the vehicle was parked when the rental period of the vehicle 108 ended may be provided by the rental server 112 to a renter device of a next renter of the vehicle 108 to help the next renter to locate and use the vehicle 108.

An ON/OFF sensor 164 indicates whether the vehicle 108 is on or off. The vehicle 108 may be turned on, for example, via actuation of one or more start/ignition buttons or switches when the vehicle 108 is off. The vehicle 108 may be turned off, for example, via actuation of the one or more start/ignition buttons or switches when the vehicle 108 is on. Additionally or alternatively, a passive entry passive start module may turn vehicle 108 on when the key fob transitions from greater than a predetermined distance from the vehicle 108 to less than a predetermined distance from the vehicle 108. In various implementations, the vehicle 108 may be turned on and off via user input to the key fob or renter device.

Figure 2:
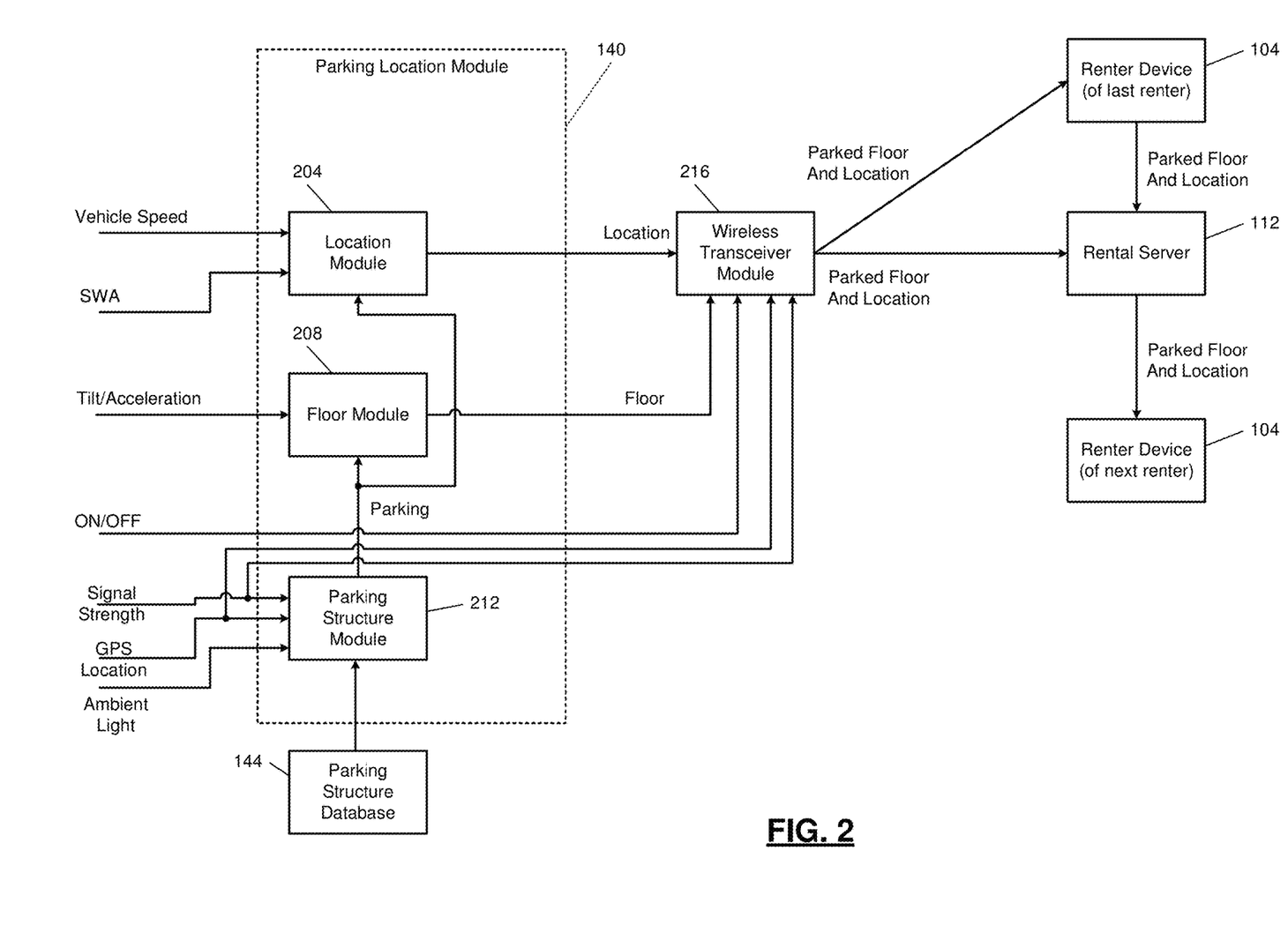
FIG. 2 is a functional block diagram of an example implementation of a location tracking and communication system.

FIG. 2 is a functional block diagram of an example implementation of a location tracking and communication system. The parking location module 140 includes a location tracking module 204, a floor module 208, and a parking structure module 212. The parking structure module 212 determines and indicates whether the vehicle 108 is in a parking structure. For example, the parking structure module 212 may determine and indicate (e.g., via a parking signal being in a first state) that the vehicle 108 is in a parking structure when the GPS location of the vehicle 108 is within the boundaries of a parking structure in the parking structure database 144. The parking structure module 212 may determine and indicate (e.g., via the parking signal being in a second state) that the vehicle 108 is in not in any parking structure when the GPS location of the vehicle 108 is not within the boundaries of any parking structure in the parking structure database 144.

When the parking signal is in the first state, the location module 204 and the floor module 208 are enabled and determine the location and floor of the vehicle 108, respectively. The location tracking module 204 and the floor module 208 may be disabled and not track the location and floor of the vehicle 108 when the parking signal is in the second state.

If the signal strength of the GPS transceiver module 132 is greater than the predetermined signal strength and remains greater than the predetermined signal strength until the vehicle 108 is parked, the GPS transceiver module 132 may determine and provide the present (parked) location of the vehicle within the parking structure. The parking structure module 212 may therefore (a) not set the parking signal to the second state when the signal strength is greater than the predetermined signal strength and (b) set the parking signal to the first state when the signal strength is less than the predetermined signal strength.

In various implementations, the parking structure module 212 may also require the ambient light intensity measured by the ambient light sensor 148 to be less than a predetermined intensity to set the parking signal to the first state. Ambient light may be low within parking structures.

The floor module 208 tracks the present floor of the vehicle 108 based on the tilt or acceleration measured by the tilt or acceleration sensor (accelerometer) 160. When the rearward tilt/acceleration (front of the vehicle 108 is vertically above the rear of the vehicle 108) measured is greater than the predetermined tilt or acceleration for at least the predetermined floor period, the floor module 208 determines that the vehicle 108 went up one floor within the parking structure and increments the present floor by one. When the forward tilt/acceleration (front of the vehicle 108 is vertically below the rear of the vehicle 108) measured is greater than the predetermined tilt or acceleration for at least the predetermined floor period, the floor module 208 determines that the vehicle 108 went down one floor within the parking structure and decrements the present floor of the vehicle 108 by one. The predetermined floor period may be, for example, 3 seconds or another suitable period. The predetermined tilt or acceleration may be, for example, 4 degrees or another suitable value.

The location module 204 tracks the present location of the vehicle (relative to the parking structure) based on the vehicle speed and the SWA as discussed above. The location module 204 may determine a distance and a direction moved by the vehicle 108 by determining a mathematical integral of the vehicle speed (providing a distance) and the SWA. The location module 204 may determine the present location, for example, using one or more lookup tables and/or equations that relate vehicle speeds and SWAs to locations.

A wireless transceiver module 216 of the vehicle 108 (e.g., the cellular transceiver module 136 or another type of wireless transceiver module) monitors whether the vehicle 108 is ON or OFF and the ending of the rental period of the vehicle 108. This includes when the signal strength of the GPS transceiver module 132 is less than the predetermined signal strength.

When the vehicle 108 is off and the rental period of the vehicle 108 ends, the wireless transceiver module 216 transmits the location and floor where the vehicle 108 was parked and OFF to the rental server 112. For example, if the signal strength of the cellular transceiver module 136 is sufficient (e.g., greater than a predetermined signal strength) to communicate with the rental server 112, the cellular transceiver module 136 may transmit the location and floor of the vehicle 108 determined by the location and floor modules 204 and 208 directly to the rental server 112 via the cellular network. If the signal strength of the cellular transceiver module 136 is not sufficient (e.g., less than the predetermined signal strength), the wireless transceiver module 216 wirelessly transmits the location and floor of the vehicle 108 determined by the location and floor modules 204 and 208 to the renter device 104 of the renter that just ended the rental period of the vehicle 108. The renter device 104 of that renter then transmits the location and floor of the vehicle 108 determined by the location and floor modules 204 and 208 to the rental server 112 when the renter device 104 can communicate with the rental server 112.

Figure 6:
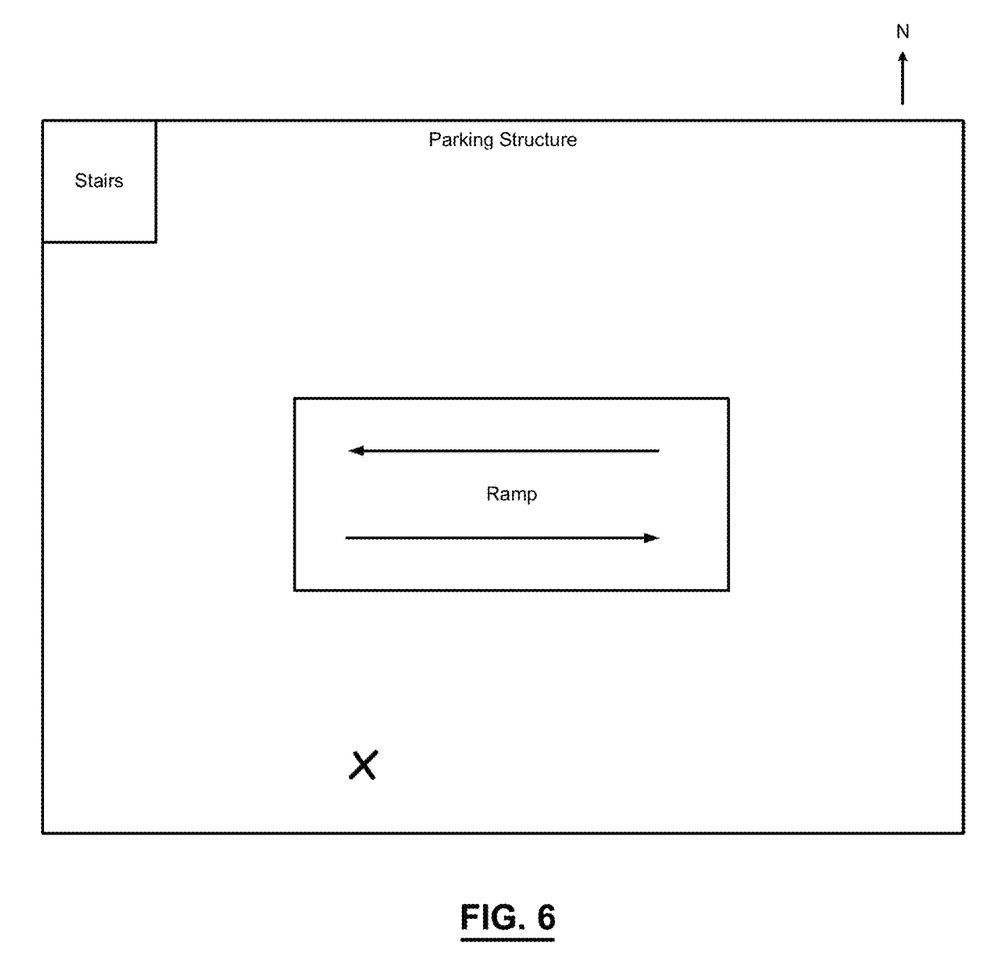
FIG. 6 includes an example illustration of a display on a renter device.

When the vehicle 108 is next rented by a next renter, the rental server 112 transmits the location and floor of the vehicle 108 determined by the location and floor modules 204 and 208 and received after the end of the last rental period to the renter device 104 of the next renter. The next renter device 104 may display the location and floor on a display of the next renter device 104. For example, the next renter device 104 may display a shape of the parking structure, one or more directions (e.g., north N) relative to the parking structure, and one or more landmark features of the parking structure to help the next renter locate the vehicle. Examples of landmarks include stairways, ramps, etc. FIG. 6 includes an example illustration of a graphical display of information on a display of a renter device 104.

Figure 3:
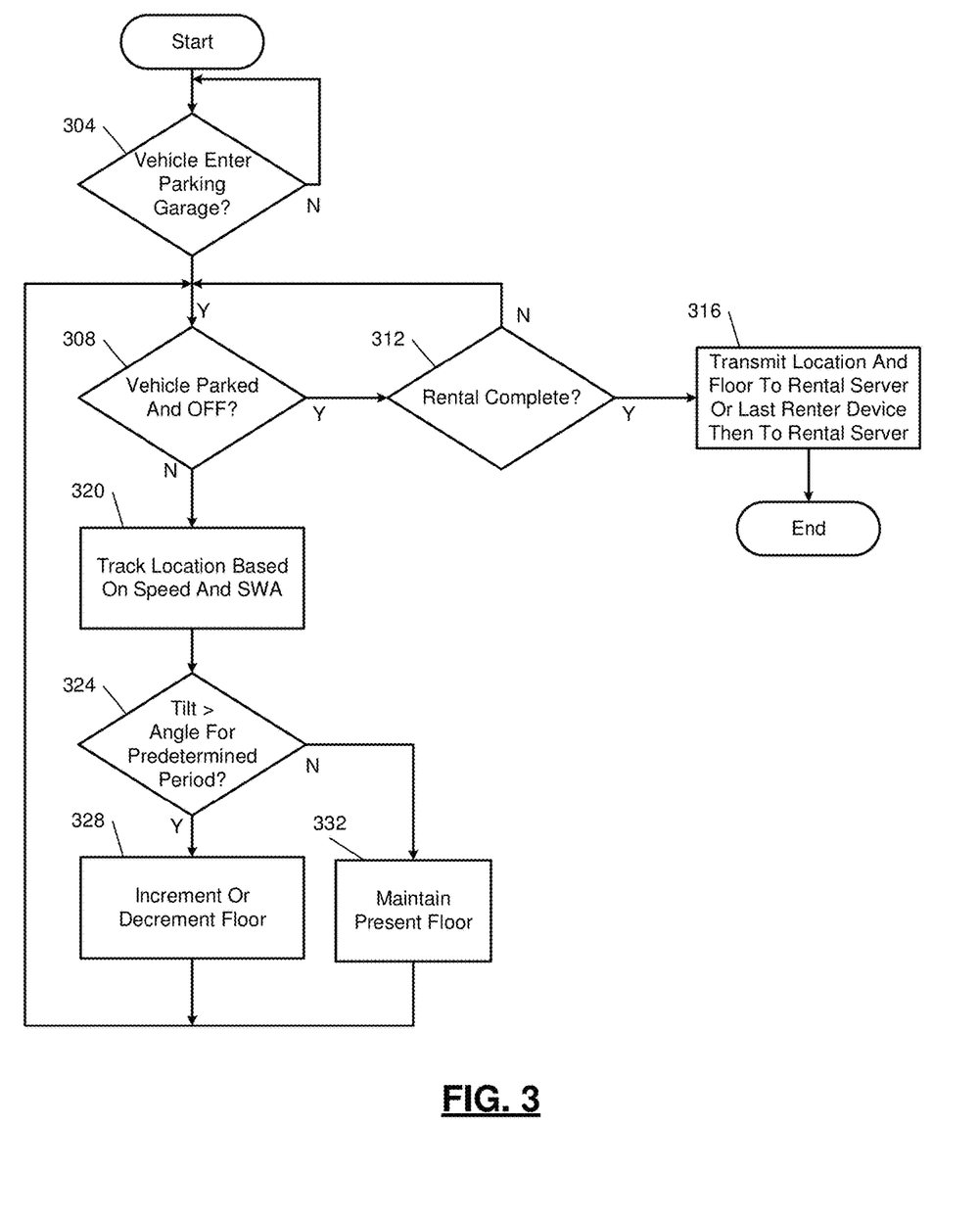
FIG. 3 includes a flowchart depicting an example method of tracking a location and floor of the vehicle within the vehicle when the signal strength of a GPS transceiver module is less than the predetermined signal strength and transmitting the location and floor of the vehicle where the vehicle is parked to a rental server.

FIG. 3 includes a flowchart depicting an example method of tracking a location and floor of the vehicle 108 within the vehicle when the signal strength of the GPS transceiver module 132 is less than the predetermined signal strength and transmitting the location and floor of the vehicle 108 where the vehicle is parked to the rental server 112. Control begins with 304 where the parking structure module 212 determines whether the vehicle 108 has entered a parking structure. For example, the parking structure module 212 may determine that the vehicle 108 has entered a parking structure when the GPS location of the vehicle 108 transitions to within the boundaries of a parking structure stored in the parking structure database 144. The GPS transceiver module 132 may be able to determine the GPS location of the vehicle 108 until the vehicle 108 is within the parking structure.

At 308, the wireless transceiver module 216 determines whether the vehicle 108 is OFF and parked. If 308 is true, control continues with 312. If 308 is false, control continues with 320, which is discussed further below. At 312, the wireless transceiver module 216 determines whether the rental period of the vehicle 108 is complete. The completion of the rental period may be indicated by the rental server 112 or the renter device 104 of the renter or may be determined by the wireless transceiver module 216, such as by comparing the current date and time with an end of a date and time range of the rental period of the vehicle 108. If 312 is true, control continues with 316. If 312 is false, control returns to 308.

At 316, the wireless transceiver module 216 transmits the location and floor within the parking structure where the vehicle 108 is parked as determined by the location and floor modules 204 and 208, respectively, The location and floor may be transmitted directly to the rental server 112, such as by the cellular transceiver module 136 or indirectly, such as by the wireless transceiver module 216 to the renter device (of the renter that just ended its rental period) and from the renter device to the rental server 112.

At 320, the location module 204 updates the present location of the vehicle 108 within the parking structure based on the vehicle speed and the SWA. For example, the location module 204 may determine a distance moved and a direction moved from a previous (e.g., last) present location based on the vehicle speed and the SWA and move from the previous present location by the distance and the direction to update the present location of the vehicle 108.

At 324, the floor module 208 determines whether the tilt or acceleration of the vehicle 108 is greater than the predetermined tilt or acceleration and has been continuously for at least the predetermined floor period. If 324 is true, the floor module 208 increments or decrements the floor by one depending on whether the tilt or acceleration was forward or rearward, as discussed above. If 324 is false, the floor module 208 maintains the present floor at 332. Control returns to 308 after 328 or 332.

In a feature, a location system of a shared vehicle includes: a location module configured to, when a signal strength of a global position system (GPS) module is less than a predetermined signal strength, determine a present location of the shared vehicle within a parking structure based on measurements from one or more sensors of the shared vehicle; a floor module configured to, when the signal strength of the GPS module is less than the predetermined signal strength, determine a present floor of the parking structure on which the shared vehicle is located; and a wireless transceiver module configured to, when the shared vehicle is off and parked within the parking structure, transmit the present location and the present floor to a rental server that is remote from the shared vehicle.

In further features, the location module is configured to determine the present location of the shared vehicle based on a speed of the shared vehicle and a steering wheel angle of the shared vehicle.

In further features, the floor module is configured to selectively one of increment and decrement the present floor based on one of a longitudinal tilt and a longitudinal acceleration of the shared vehicle.

In further features, the floor module is configured to selectively one of increment and decrement the present floor when the one of the longitudinal tilt and the longitudinal acceleration is greater than one of a predetermined tilt and a predetermined acceleration continuously for a predetermined period.

In further features, the floor module is configured to increment the present floor when the one of the longitudinal tilt and the longitudinal acceleration in a rearward direction of the shared vehicle is greater than the one of the predetermined tilt and the predetermined acceleration continuously for the predetermined period.

In further features, the floor module is configured to decrement the present floor when the one of the longitudinal tilt and the longitudinal acceleration in a forward direction of the shared vehicle is greater than the one of the predetermined tilt and the predetermined acceleration continuously for the predetermined period.

In further features, a parking structure module is configured to indicate whether the shared vehicle is within a parking structure based on a second present location of the shared vehicle determined by the GPS module of the shared vehicle, where the floor module and the location module are configured to determine the present floor and the present location, respectively, in response to an indication from the parking structure module that the shared vehicle is within a parking structure.

In further features, the parking structure module is configured to indicate that the shared vehicle is within a parking structure when the second present location is within boundaries of a parking structure stored in a parking structure database.

In further features, the parking structure module is configured to indicate that the shared vehicle is not within a parking structure when the second present location is not within boundaries of any parking structure stored in a parking structure database.

In further features, a parking structure module is configured to indicate whether the shared vehicle is within a parking structure based on an ambient light intensity and the signal strength of the GPS module, where the floor module and the location module are configured to determine the present floor and the present location, respectively, in response to an indication from the parking structure module that the shared vehicle is within a parking structure.

In further features, the parking structure module is configured to indicate that the shared vehicle is within a parking structure when the signal strength is less than the predetermined signal strength and the ambient light intensity is less than a predetermined intensity.

In further features, the parking structure module is configured to indicate that the shared vehicle is within not a parking structure when at least one of (a) the signal strength is not less than the predetermined signal strength and (b) the ambient light intensity is not less than a predetermined intensity.

In further features, the wireless transceiver module includes a cellular transceiver module configured to transmit the present location and the present floor to the rental server via a cellular network.

In further features, a computing device of a renter of the shared vehicle is included, where the rental server is configured to selectively transmit the present location and the present floor of the shared vehicle to the computing device of the renter.

In further features: the wireless transceiver module is configured to transmit the present location and the present floor to a computing device of a renter of the shared vehicle; the location system further includes the computing device; and the computing device is separate from the shared vehicle and is configured to transmit the present location and the present floor received from the wireless transceiver module of the shared vehicle to the rental server via a cellular network.

In further features: a second computing device of a second renter of the shared vehicle is included, where the rental server is configured to selectively transmit the present location and the present floor of the shared vehicle to the second computing device of the second renter.

In further features, the second computing device is configured to display, on a display, an indicator of boundaries of the parking structure and the present location and floor of the shared vehicle within the parking structure.

In a feature, a method for a shared vehicle includes: when a signal strength of a global position system (GPS) module is less than a predetermined signal strength, determining a present location of the shared vehicle within a parking structure based on measurements from one or more sensors of the shared vehicle; when the signal strength of the GPS module is less than the predetermined signal strength, determining a present floor of the parking structure on which the shared vehicle is located; and when the shared vehicle is off and parked within the parking structure, wirelessly transmitting the present location and the present floor to a rental server that is remote from the shared vehicle.

In further features, determining the present location of the shared vehicle includes determining the present location of the shared vehicle based on a speed of the shared vehicle and a steering wheel angle of the shared vehicle.

In further features, determining the present floor of the parking structure includes selectively one of incrementing and decrementing the present floor based on one of a longitudinal tilt and a longitudinal acceleration of the shared vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A location system of a shared vehicle, comprising:
a location module configured to, when a signal strength of a global position system (GPS) module is less than a predetermined signal strength, determine a present location of the shared vehicle within a parking structure based on measurements from one or more sensors of the shared vehicle;
a floor module configured to, when the signal strength of the GPS module is less than the predetermined signal strength, determine a present floor of the parking structure on which the shared vehicle is located;
a wireless transceiver module configured to, when the shared vehicle is off and parked within the parking structure, when a second signal strength of a cellular transceiver module of the shared vehicle is less than a second predetermined signal strength, transmit the present location and the present floor to a first computing device of a first renter at an end of a first rental of the first renter of the shared vehicle;
the first computing device, wherein the first computing device is configured to transmit the present location and the present floor to a rental server that is remote from the shared vehicle; and
the rental server, wherein the rental server is configured to transmit the present location and the present floor of the shared vehicle to a second computing device of a second renter of the shared vehicle for a second rental of the shared vehicle after the first rental,
wherein the second computing device is different than the first computing device.

2. The location system of claim 1 wherein the location module is configured to determine the present location of the shared vehicle based on a speed of the shared vehicle and a steering wheel angle of the shared vehicle.

3. The location system of claim 1 wherein the floor module is configured to selectively one of increment and decrement the present floor based on one of a longitudinal tilt and a longitudinal acceleration of the shared vehicle.

4. The location system of claim 3 wherein the floor module is configured to selectively one of increment and decrement the present floor when the one of the longitudinal tilt and the longitudinal acceleration is greater than one of a predetermined tilt and a predetermined acceleration continuously for a predetermined period.

5. The location system of claim 4 wherein the floor module is configured to increment the present floor when the one of the longitudinal tilt and the longitudinal acceleration in a rearward direction of the shared vehicle is greater than the one of the predetermined tilt and the predetermined acceleration continuously for the predetermined period.

6. The location system of claim 4 wherein the floor module is configured to decrement the present floor when the one of the longitudinal tilt and the longitudinal acceleration in a forward direction of the shared vehicle is greater than the one of the predetermined tilt and the predetermined acceleration continuously for the predetermined period.

7. The location system of claim 1 further comprising a parking structure module configured to indicate whether the shared vehicle is within a parking structure based on a second present location of the shared vehicle determined by the GPS module of the shared vehicle,
wherein the floor module and the location module are configured to determine the present floor and the present location, respectively, in response to an indication from the parking structure module that the shared vehicle is within a parking structure.

8. The location system of claim 7 wherein the parking structure module is configured to indicate that the shared vehicle is within a parking structure when the second present location is within boundaries of a parking structure stored in a parking structure database.

9. The location system of claim 7 wherein the parking structure module is configured to indicate that the shared vehicle is not within a parking structure when the second present location is not within boundaries of any parking structure stored in a parking structure database.

10. The location system of claim 1 further comprising a parking structure module configured to indicate whether the shared vehicle is within a parking structure based on an ambient light intensity and the signal strength of the GPS module,
wherein the floor module and the location module are configured to determine the present floor and the present location, respectively, in response to an indication from the parking structure module that the shared vehicle is within a parking structure.

11. The location system of claim 10 wherein the parking structure module is configured to indicate that the shared vehicle is within a parking structure when the signal strength is less than the predetermined signal strength and the ambient light intensity is less than a predetermined intensity.

12. The location system of claim 10 wherein the parking structure module is configured to indicate that the shared vehicle is within not a parking structure when at least one of (a) the signal strength is not less than the predetermined signal strength and (b) the ambient light intensity is not less than a predetermined intensity.

13. The location system of claim 1 wherein the wireless transceiver module includes a cellular transceiver module configured to transmit the present location and the present floor to the rental server via a cellular network.

14. The location system of claim 13 further comprising: a computing device of a renter of the shared vehicle,
wherein the rental server is configured to selectively transmit the present location and the present floor of the shared vehicle to the computing device of the renter.

15. The location system of claim 1 wherein:
the wireless transceiver module is configured to transmit the present location and the present floor to a computing device of a renter of the shared vehicle;
the location system further includes the computing device; and
the computing device is separate from the shared vehicle and is configured to transmit the present location and the present floor received from the wireless transceiver module of the shared vehicle to the rental server via a cellular network.

16. The location system of claim 15 further comprising:
a second computing device of a second renter of the shared vehicle,
wherein the rental server is configured to selectively transmit the present location and the present floor of the shared vehicle to the second computing device of the second renter.

17. The location system of claim 16 wherein the second computing device is configured to display, on a display, an indicator of boundaries of the parking structure and the present location and floor of the shared vehicle within the parking structure.

18. A method for a shared vehicle, comprising:
when a signal strength of a global position system (GPS) module is less than a predetermined signal strength, determining a present location of the shared vehicle within a parking structure based on measurements from one or more sensors of the shared vehicle;
when the signal strength of the GPS module is less than the predetermined signal strength, determining a present floor of the parking structure on which the shared vehicle is located;
when the shared vehicle is off and parked within the parking structure, when a second signal strength of a cellular transceiver module of the shared vehicle is less than a second predetermined signal strength, wirelessly transmitting the present location and the present floor to a first computing device of a first renter at an end of a first rental of the first renter of the shared vehicle;
by the first computing device, transmitting the present location and the present floor to a rental server that is remote from the shared vehicle; and
by the rental server, transmitting the present location and the present floor of the shared vehicle to a second computing device of a second renter of the shared vehicle for a second rental of the shared vehicle after the first rental,
wherein the second computing device is different than the first computing device.

19. The method of claim 18 wherein determining the present location of the shared vehicle includes determining the present location of the shared vehicle based on a speed of the shared vehicle and a steering wheel angle of the shared vehicle.

20. The method of claim 18 wherein determining the present floor of the parking structure includes selectively one of incrementing and decrementing the present floor based on one of a longitudinal tilt and a longitudinal acceleration of the shared vehicle.

* * * * *